Aug. 23, 1966 C. B. GIBSON, JR 3,268,659
APPARATUS FOR EDGE LIGHTING INTERNAL
GRATICULE OF CATHODE RAY TUBE
Filed June 13, 1963
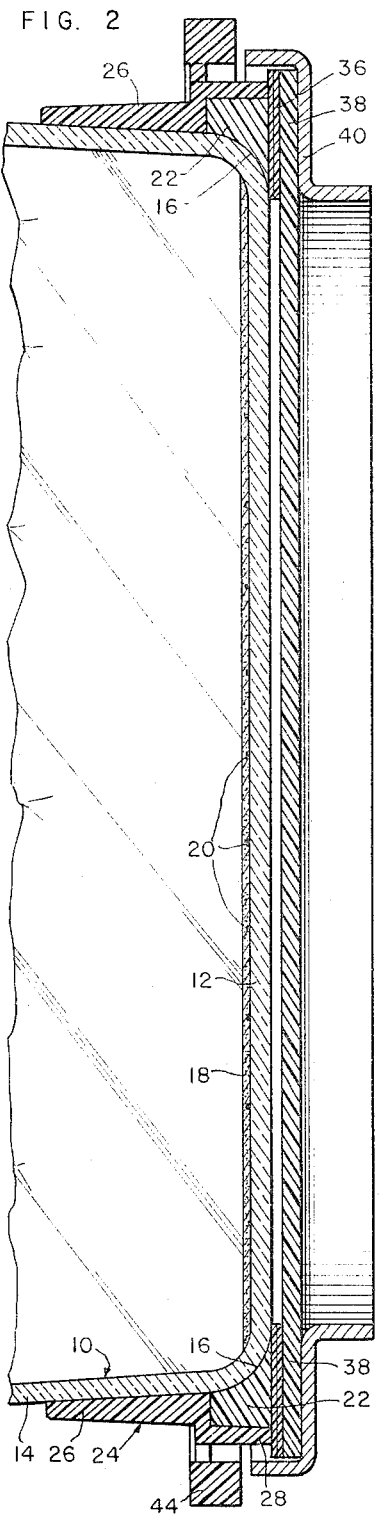
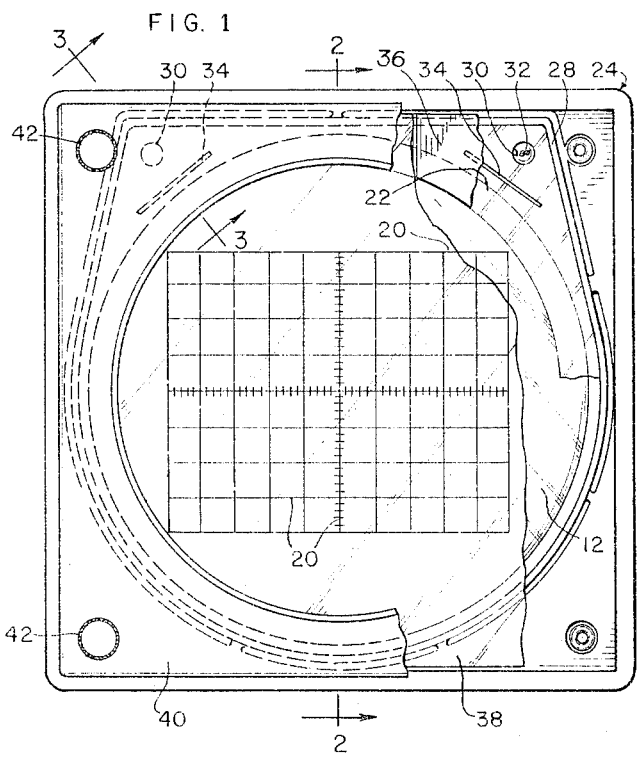
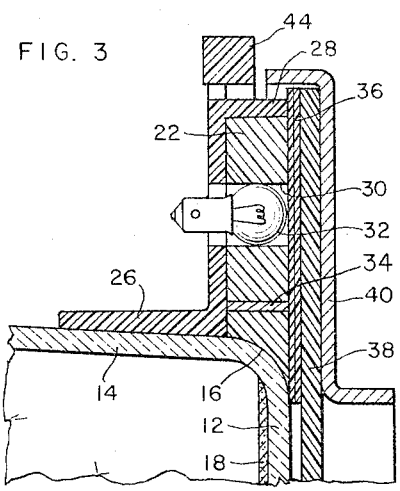
INVENTOR
CHARLES B. GIBSON JR.
BY
BUCKHORN, BLORE, KLARQUIST & SPARKMAN
ATTORNEYS

3,268,659
APPARATUS FOR EDGE LIGHTING INTERNAL GRATICULE OF CATHODE RAY TUBE
Charles B. Gibson, Jr., Portland, Oreg., assignor to Tektronix, Inc., Beaverton, Oreg., a corporation of Oregon
Filed June 13, 1963, Ser. No. 287,616
8 Claims. (Cl. 178—7.84)

The subject matter of the present invention relates generally to light transmission apparatus, and in particular to apparatus for edge lighting the internal graticule of a cathode ray tube by transmitting light through the rounded outer edge of the face plate of such tube into the interior of such face plate to illuminate a graticule scale formed on the inner surface of the face plate.

The apparatus of the present invention is especially useful when employed with the cathode ray tube of a cathode ray oscilloscope. Such a tube may be provided with an internal graticule scale formed on the inner surface of its face plate beneath the phosphor screen of such tube in order to prevent image parallax between the electrical signal wave form produced on such phosphor screen and the image of such graticule scale. Conventional cathode ray tubes are provided with an external graticule scale on a separate plastic member positioned outside of the tube so that such graticule scale is spaced from the phosphor screen by the thickness of the face plate of such tube. This spacing results in an image distortion with respect to the apparent position of the graticule scale superimposed on the wave form when such wave form is viewed by the observer from different angles. To avoid this parallax problem it has previously been suggested to form a graticule scale on the inner surface of the face plate of the cathode ray tube so that such graticule scale is coplanar with the phosphor screen. However, the edge lighting of such internal graticules has been heretofore inadequate in conventional cathode ray tubes having annular glass envelopes and molded glass face plates. The glass-air interface existing at the outer edge of the face plate of conventional tubes has previously prevented adequate illumination of the internal graticule because light rays striking such outer edge are reflected therefrom in such a manner as to restrict the amount of light contributing to illumination of the graticule scale.

The apparatus of the present invention overcomes these disadvantages by mounting a light guide member of plastic or other suitable material having an index of refraction similar to that of the glass of the face plate in intimate contact with the outer edge of such face plate to eliminate this glass-air interface. This may be accomplished by either making the light guide of flexible material and pressing such light guide into intimate contact with the rounded outer edge of the face plate, or by molding a light guide of rigid material directly on the face plate so that it conforms to the surface of the rounded outer edge of such face plate and is fastened thereto during the molding process. Of course, the flexible light guide member can also be molded into engagement with the outer edge of the glass face light to obtain even better contact with such outer edge. This elimination of the glass-air interface enables the light to be transmitted from the light guide member through the outer edge of the face plate into the interior of such face plate and prevents reflection of the light from the face plate at such interface. Thus, the light transmission apparatus of the present invention provides an economical and efficient way of edge lighting the internal graticule of a cathode ray tube having a conventional glass envelope.

It is therefore one object of the present invention to provide an improved light transmission apparatus.

Another object of the invention is to provide an improved apparatus for edge lighting the internal graticule of a cathode ray tube which is simple and economical.

A further object of the invention is to provide an improved apparatus for transmitting light through the outer edge of the glass face plate of a cathode ray tube by eliminating the glass-air interface at such outer edge to increase the intensity of illumination of such graticule.

An additional object of the present invention is to provide an improved apparatus for edge lighting the internal graticule of a cathode ray tube in which a light guide member of transparent material, having an index refraction similar to that of the glass face plate of such tube, is supported in intimate contact with the rounded outer edge of such face plate, to eliminate the glass-air interface at such outer edge and to increase the transmission of light into the face plate through such outer edge.

Still another object of the present invention is to provide apparatus for edge lighting the internal graticule of a cathode ray tube in which a light guide member of transparent material is molded directly on the curved outer edge of the glass face plate of such tube to eliminate the glass-air interface at such outer edge to illuminate such graticule more uniformly and with higher intensity.

Additional objects and advantages of the present invention will be apparent from the following detailed description of the preferred embodiment thereof and from the attached drawings of which:

FIG. 1 is a plan view of the front end of a cathode ray tube having a light transmission apparatus in accordance with the present invention:

FIG. 2 is a vertical sectional view taken along the line 2—2 of FIG. 1; and

FIG. 3 is a partial sectional view taken along the line 3—3 of FIG. 1, shown on an enlarged scale.

As shown in FIGS. 1 and 2 the evacuated envelope of a cathode ray tube 10 includes a face plate 12 of glass which is secured to a funnel portion 14 of such envelope in a conventional manner, such as by flame sealing. The face plate 12 is molded with a rounded corner at the outer edge 16 to increase the strength of the envelope at such corner and prevent cracking due to heat and pressure during the degassing and evacuation procedure. A fluorescent screen 18 is provided as a layer of phosphor material over the inner surface of the face plate 12. The electron beam of the cathode ray tube strikes such fluorescent screen and produces a light image of the electrical signal wave form under investigation. In order to determine the voltage and time characteristics of the displayed wave form, a graticule scale 20 is provided on the inner surface of the face plate 12 beneath the phosphor screen by printing a plurality of intersecting lines of reflective material such as glass frit on such face plate and fusing such frit, or by scribing grooves in such inner surface.

The graticule scale 20 may be 8 by 10 centimeters and divided into a plurality of 1 centimeter squares by vertical and horizontal graticule lines. Such graticule scale may be provided with a horizontal and vertical scale axes which are provided with a plurality of marker lines spaced 0.2 cm. apart in order to enable more arcuate measurement of the waveform characteristics.

Previous cathode ray tubes having internal graticules on the inner surface of their face plates employ graticule lines made out of a black material so that they contrast with the white color of their phosphor screens. These tubes have depended upon light transmitted through the front of the face plate in order to illuminate such graticule lines by the ambient light of the room in which the oscilloscope is located. However, this room light is usually not of sufficient brightness to enable adequate illumination of the graticule scale for comfortable viewing by the observer, especially when such light must be dimmed to view the wave form of a fast transmit signal. Previously, it was thought that such an internal graticule could not be illuminated by edge lighting by transmitting light rays from a light source at the side of the face plate through the rounder outer edge 16 of the molded glass face plate, because of the reflection of such light rays from such rounded outer edge. Also, it was believed that any light which did enter the face plate was transmitted away from the graticule scale 20 down the funnel portion 14 of the envelope.

It has been found that the glass-air interface at the rounded outer edge 16 of the face plate 12 may be eliminated either by pressing a light guide 22 of flexible transparent material on such rounded outer edge, or by forming such light guide of rigid material and molding it directly onto the outer edge of the face plate in intimate contact therewith. The light guide 22 may be made of a flexible silicone plastic material such as the transparent silicone rubber including a polymethylsiloxane material sold by General Electric Company under the trademark "Silicast" with the identifying number of L.T.V. 602, or a silicone resin material sold by Dow Corning under their trademark "Sylgard" and identifying number 182. When a rigid light guide is desired it may be made from polystyrene or any suitable acrylic plastic such as polymethyl methacrylate, which is light transparent and has an index refraction similar to that of the glass of face plate 12. It should be noted that the silicone rubber sold under the trademark "Silicast" has an index refraction 1.406 even though the index refraction of the glass face plate 12 may be 1.557. Therefore, the indexes of refraction of the materials of the light guide and the face plate do not have to be identical in order to produce the desired results. However, such indexes of refraction cannot be too far apart or a glass-plastic interface will result which cause the reflection of light from the outer edge of the face plate in the same manner as a glass-air interface.

A mold member 24 may be provided around the face plate 12 so that an annular support portion 26 of such member is in frictional engagement with the funnel portion 18 of the envelope. The mold member 24 is provided with a forwardly extending wall portion 28 which is spaced from the rounded outer edge 16 of the face plate and forms a container with such face plate. The liquid material of the light guide 22 is poured into this container when the tube 10 is held in an upright position before such liquid hardens to form a solid light guide member. Thus the light guide is molded onto the outer surface of the rounded outer edge 16 so that it is in intimate contact with such outer surface. It should be noted that either flexible plastic material or the rigid plastic material referred to above may be used for the light guide member 22 and be molded in situ on the face plate by use of the mold member 24. This enables the light guide to be "custom made" for the cathode ray tube with which it is employed so that the mating surface of the light guide conforms to every imperfection in the surface of the rounded outer edge 16 of the face plate.

The light guide member 22 is provided with a pair of apertures 30 which are of a diameter to fit snugly against the glass envelope of a pair of light bulbs 32 inserted into such apertures, as shown in FIG. 3, so that the light rays emitted by such bulbs enter the light guide member 22 through the walls of the apertures. A pair of reflector shields 34 of aluminum or other suitable material may be molded within the light guide and positioned between the apertures 30 and the central opening through the light guide containing the face plate. These reflector shields 34 prevent bright spots from appearing on the face plate immediately adjacent the light bulbs 32 and enable more uniform illumination of the graticule scale 20. In order to increase the intensity of illumination of the graticule scale, the light guide 22 may be provided with light reflective coatings of white enamel on the outer surfaces thereof which are not in contact with the outer edge 16 of the face plate. Alternatively, the mold member 24 may be made of white polypropylene plastic in order to reflect light at the outer edge and the rear surface of the light guide back into such light guide. Also, a reflector ring 36 may be provided over the front surface of the light guide member 22 with a central opening therein so as not to obscure the fluorescent screen and graticule scale of the cathode ray tube. The reflector ring 36 may be formed as a laminate of two sheets of different colored methyl methacrylate plastic which are, respectively, white and black in color. Such reflector ring is positioned so that the white plastic layer is in contact with the front surface of the light guide 22 in order to reflect light rays from such reflector ring back into such light guide.

An implosion shield 38 in the form of a flat sheet of clear methyl methacrylate plastic may be provided over the face plate 12 in order to prevent injury to observers if the evacuated envelope should break and cause an implosion of the glass envelope. A cover bezel 40 of aluminum or other metal may be provided over the implosion shield 38 to clamp the implosion shield, the reflector ring 36 and the light guide 22 between such bezel and the mold member 26 by means of four mounting nuts 42 threaded onto studs extending from the chassis of the oscilloscope through apertures in such members. A camera bezel (not shown) may be used in place of the bezel 40 shown, such camera bezel being shaped to support an oscilloscope camera on the outer flange 44 of the mold member 46 in light-tight relationship. It should be noted that the outer flange portion 44 is connected to the wall portion 28 of the mold member by a plurality of spaced webs in order to provide flexibility to such outer flange so that forces exerted on such flange during the mounting of the cathode ray tube 10 in the chassis of the oscilloscope does not break the molded seal between the light guide 22 and the face plate 12.

It will be obvious to those having ordinary skill in the art that various changes may be made in the details of the above described preferred embodiment of the present invention without departing from the spirit of the invention. For example, the light guide member 22 may be made of transparent material other than plastic and the mold member can be removed after forming such light guide. Therefore, the scope of the present invention should only be determined by the following claims.

I claim:

1. Apparatus for transmitting light to a remotely located indicia on an inner surface of an envelope, comprising:

a sealed envelope including a light transparent display portion having a rounded outer edge which tends to prevent light from being transmitted into the display portion through said outer edge;

indicia formed on the inner surface of said display portion;

a light guide member of light transparent material having an index of refraction similar to that of said display portion, said light guide member being supported in intimate contact with the outer edge of said display portion to prevent the existence of an air interface at said outer edge; and means positioned outside of said envelope remote from said display portion for emitting light rays into said light guide member so that said light rays are transmitted by said light guide member through said outer edge of said display portion into said plate to illuminate said indicia.

2. Apparatus for transmitting light to a remotely located scale on the inner surface of the envelope of an electron tube, comprising:

a sealed envelope including a light transparent display portion of glass material having a rounded outer edge which tends to prevent external light from being transmitted into said display portion through said outer edge;

a scale formed on the inner surface of said envelope member;

a light guide member of light transparent plastic material having an index of refraction similar to that of said glass material, said light guide member being supported in intimate contact with the outer edge of said envelope member to prevent the existence of a glass-air interface at said outer edge; and means outside of said envelope for transmitting light rays into said light guide member so that said light rays are transmitted by said light guide member through said outer edge of said envelope member into said plate to illuminate said scale.

3. Apparatus for edge lighting the internal graticule of a cathode ray tube, comprising:

a tube envelope having a light transparent face plate portion of glass material within a rounded outer edge which tends to prevent light from being transmitted into the face plate through said outer edge;

a graticule scale formed on the inner surface of said face plate;

a light guide member of rigid light transparent material having an index of refraction similar to that of said glass material, said light guide member being bonded to the outer edge of said face plate to prevent the existence of a glass-air interface at said outer edge; and means positioned outside said envelope for transmitting light rays into said light guide member so that said light rays are transmitted by said light guide member through said outer edge of said face plate into said face plate to illuminate said graticule scale.

4. Apparatus for edge lighting the internal graticule of a cathode ray tube, comprising:

a tube envelope having a light transparent face plate portion of glass material with a rounded outer edge around the periphery thereof which tends to prevent light from being transmitted into the face plate through said outer edge;

a graticule scale formed on the surface of the inner side of said face plate;

a light guide member of flexible, light transparent plastic material having an index of refraction similar to that of said glass material, said light guide member being supported so that it is pressed into intimate contact with the outer edge of said face plate to conform to the curved surface of said outer edge in order to prevent the existence of a glass-air interface at said outer edge; and means positioned outside said envelope for projecting light rays into said light guide member so that said light rays are transmitted by said light guide member through said outer edge of said face plate into said face plate to illuminate said graticule scale.

5. Apparatus for edge lighting the internal graticule of a cathode ray tube, comprising:

a cathode ray tube having an envelope with a light transparent face plate portion of glass covered by a phosphor layer on the inner side surface thereof, said face plate having a rounded outer edge extending around the periphery thereof which tends to prevent light from being transmitted into the face plate through said outer edge;

a graticule scale formed on said inner surface of said face plate beneath said phosphor layer;

a light guide member of transparent plastic material having an index of refraction similar to that of said glass, said light guide member having an opening therethrough to fit around said face plate and being molded into intimate contact with the rounded outer edge of said face plate; and a light source positioned within a hole in said light guide member to emit light rays into said light guide member so that said light rays are transmitted substantially uniformly by said light guide member through said outer edge of said face plate into said face plate to illuminate said graticule scale.

6. Apparatus for edge lighting the internal graticule of a cathode ray tube, comprising:

a cathode ray tube having an envelope with a light transparent face plate portion of glass covered by a phosphor layer on the inner side surface thereof, said face plate having a rounded outer edge extending around the periphery thereof;

a graticule scale formed on said inner surface of said face plate beneath said phosphor layer;

a light guide member of transparent plastic material having an index of refraction similar to that of said glass, said light guide member having an opening therethrough to fit around said face plate;

means for molding said light guide member on said face plate so that said guide member is bonded in intimate contact with the rounded outer edge of said face plate;

a plurality of spaced light bulbs positioned within apertures in said light guide member to emit light rays into said light guide member so that said light rays are distributed substantially uniformly around said face plate by said light guide member and transmitted through said outer edge of said face plate into said face plate to uniformly illuminate said graticule scale;

means for reflecting said light rays at the exterior surfaces of said light guide which are not in contact with said face plate to increase the intensity of illumination of said graticule scale.

7. Apparatus for edge lighting the internal graticule of a cathode ray tube, comprising:

a cathode ray tube having an envelope with a light transparent face plate portion of glass covered by a phosphor layer on the inner side surface thereof, said face plate having a rounded outer edge extending around the periphery thereof;

a graticule scale formed on said inner surface of said face plate beneath said phosphor layer;

a rigid light guide member of transparent plastic material having an index of refraction similar to that of said glass, said light guide member having an opening therethrough to fit around said face plate;

mold means attached to said envelope for forming said light guide member on said face plate so that said guide member is bonded into intimate contact with the rounded outer edge of said face plate;

a plurality of spaced light sources positioned within apertures in said light guide member to emit light rays into said light guide member so that said light rays are transmitted substantially uniformly by said light guide member through said outer edge of said face plate into said face plate to illuminate said graticule scale; and means for reflecting said light rays at the exterior surfaces of said light guide which are not in contact with said face plate to increase the intensity of illumination of said graticule scale.

8. Apparatus for edge lighting the internal graticule of a cathode ray tube, comprising:

a cathode ray tube having an envelope with a tubular side portion and a light transparent face plate end portion of glass covered by a phosphor layer on the inner surface thereof, said face plate having a rounded outer edge extending around the periphery thereof which is curved inwardly toward the outer surface of said face plate from the outer surface of said side portion;

a graticule scale formed by lines of glass frit deposited on said inner surface of said face plate beneath said phosphor layer;

a rigid light guide member of transparent plastic material having an index of refraction similar to that of said glass, said light guide member having an opening therethrough to fit around said face plate;

mold means for forming said light guide member on said face plate so that said guide member is bonded into intimate contact with the rounded outer edge of said face plate to prevent the existence of a glass-air interface at said outer edge;

a plurality of spaced light bulbs positioned within apertures in said light guide member to emit light rays into said light guide member so that said light rays are transmitted substantially uniformly by said light guide member through said outer edge of said face plate into said face plate to illuminate said graticule scale;

a plurality of reflector shields positioned in said light guide member adjacent each of said light bulbs between said opening and said apertures to prevent uneven illumination of said face plate; and means for reflecting said light rays at the exterior surfaces of said light guide which are not in contact with said face plate to increase the intensity of illumination of said graticule scale.

References Cited by the Examiner
UNITED STATES PATENTS

| | | | |
|---|---|---|---|
| 2,251,984 | 8/1941 | Cleaver et al. | 178—7.84 |
| 2,330,604 | 9/1943 | Messner | 178—7.84 |
| 2,566,332 | 9/1951 | Hubert et al. | 178—7.84 |
| 2,819,458 | 1/1958 | Bang | 178—7.83 |

DAVID G. REDINBAUGH, *Primary Examiner.*

R. L. RICHARDSON, *Assistant Examiner.*